(12) United States Patent
Yoo et al.

(10) Patent No.: US 9,277,476 B2
(45) Date of Patent: Mar. 1, 2016

(54) MARITIME WIRELESS COMMUNICATION METHOD AND APPARATUS

(71) Applicant: Electronics and Telecommunications Research Institute, Daejeon (KR)

(72) Inventors: Dae-Seung Yoo, Gyeongsangnam-do (KR); Hyung-Joo Kim, Daejeon (KR); Seung-Yong Lee, Daejeon (KR); Jin-Kyu Choi, Daejeon (KR); Jong-Min Park, Daejeon (KR); Gwang-Ja Jin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 128 days.

(21) Appl. No.: 13/916,660

(22) Filed: Jun. 13, 2013

(65) Prior Publication Data

US 2014/0018066 A1 Jan. 16, 2014

(30) Foreign Application Priority Data

Jul. 16, 2012 (KR) .......................... 10-2012-0077114

(51) Int. Cl.
*H04W 40/00* (2009.01)
*H04W 40/02* (2009.01)

(52) U.S. Cl.
CPC .............. *H04W 40/00* (2013.01); *H04W 40/02* (2013.01)

(58) Field of Classification Search
CPC .......... H04W 40/00; H04Q 7/24; H04Q 7/20; G08B 23/00; G06F 15/16
USPC .......... 455/552.1, 553.1, 550.1, 431, 98, 430; 370/392
See application file for complete search history.

(56) References Cited

U.S. PATENT DOCUMENTS

| | | | | |
|---|---|---|---|---|
| 4,203,160 | A * | 5/1980 | Doherty | H04B 11/00 128/201.19 |
| 5,243,530 | A * | 9/1993 | Stanifer | G01C 21/00 340/990 |
| 6,256,497 | B1 * | 7/2001 | Chambers | 455/433 |
| 7,113,127 | B1 * | 9/2006 | Banet et al. | 342/357.31 |
| 2003/0231238 | A1 * | 12/2003 | Chew et al. | 348/14.02 |
| 2005/0138120 | A1 * | 6/2005 | Gundersen et al. | 709/204 |

(Continued)

FOREIGN PATENT DOCUMENTS

| KR | 10-2003-0036458 A | 5/2003 |
|---|---|---|
| KR | 10-2009-0121258 A | 11/2009 |

(Continued)

*Primary Examiner* — Michael Mapa
*Assistant Examiner* — Tanisha Jackson
(74) *Attorney, Agent, or Firm* — Rabin & Berdo, P.C.

(57) ABSTRACT

Disclosed herein are a maritime communication apparatus and method. The maritime communication apparatus includes a land-based network communication unit, a maritime network communication unit, and a communication control unit. The land-based network communication unit communicates with a land-based communication network. The maritime network communication unit communicates with a maritime communication network. The communication control unit links the communication of the land-based network communication unit with the communication of the maritime network communication unit in accordance with a destination address of data provided by any one of the land-based network communication unit and the maritime network communication unit.

11 Claims, 4 Drawing Sheets

(56) References Cited

U.S. PATENT DOCUMENTS

2007/0110017 A1* 5/2007 Fulknier et al. ............... 370/338
2008/0227386 A1   9/2008 Dayal et al.
2009/0271054 A1* 10/2009 Dokken ......................... 701/21
2011/0095914 A1*  4/2011 Velado et al. ................. 340/984

FOREIGN PATENT DOCUMENTS

| KR | 10-2011-0033553 A | 3/2011 |
| KR | 10-20110043963 A | 4/2011 |

* cited by examiner

MARITIME WIRELESS COMMUNICATION METHOD AND APPARATUS

CROSS REFERENCE TO RELATED APPLICATION

This application claims the benefit of Korean Patent Application No. 10-2012-0077114, filed on Jul. 16, 2012, which is hereby incorporated by reference in its entirety into this application.

BACKGROUND OF THE INVENTION

1. Technical Field

The present invention relates generally to wireless communication technology, and, more particularly, to a maritime wireless communication method and apparatus that are capable of supporting commercial broadband communication service at sea.

2. Description of the Related Art

Maritime communication is a very old form of communication. Maritime communication is internationally protected because it is closely related to the safety of humans, and it has evolved slower than other communication technologies. However, with the recent rapid advance of communication technology, maritime communication is also in the process of being actively developed.

Maritime communication systems include medium frequency (MF), high frequency (HF) and very high frequency (VHF) band communication equipment and satellite communication equipment in order to perform worldwide maritime communication, and provide voice-oriented communication services with the exception of a simple text transfer service.

A Global Maritime Distress and Safety System (GMDSS) based on a communication system in which pieces of communication equipment having a variety of purposes were integrated with each other was introduced at the end of 1990s. Recently, under the leadership of the International Maritime Organization (IMO), an E-navigation strategy that is intended to collect, integrate, exchange, represent and analyze ship and land-related maritime information using an electronic method, thereby ensuring safety and security at sea and protecting a maritime environment has been discussed with the aim of future enforcement.

Meanwhile, although many ships currently navigate coastal waters, it is difficult for the ships to receive various communication services from land because there is no provision for a maritime broadband digital communication network. Meanwhile, ships on long distance voyages are dependent upon expensive satellite communication.

Furthermore, although various communication means for a GMDSS are installed on a ship, most of them are used for voice communication in an analog form. Some communication devices are capable of digital transmission, but provide service at limited speeds and within very limited areas.

In some countries, maritime digital Very High Frequency (VHF) band communication has been deployed and is being operated on a test basis. However, this is used within very limited areas, and whether it will spread all over the world is not certain. Although ships navigating coastal waters utilize land-based communication networks, such as existing mobile phone networks, the use of the land-based communication networks cannot be fully utilized because the range of communication over the land-based communication networks is limited, and it is difficult for ships that navigate various waters to utilize and communicate over the land-based communication networks.

Meanwhile, the required bandwidth for each ship, exclusive of that for broadcast information, is estimated to be about 100 Kbytes/day based on 2009 estimated figures and to be 10 Mbytes/day based on 2011 estimated figures, and is expected to increase when the e-Navigation era is reached.

Furthermore, in light of the fact that the accidents involving ships mostly occur in coastal waters within 100 km of the coast, various ship safety navigation solutions capable of preventing accidents involving ships have been developed. Wireless communication between ships is required for the safe navigation of the ships. Currently available land-based wireless communications have the disadvantage of short coverage distances. In particular, satellite communication has the disadvantages of low data throughput and high cost.

Korean Patent Application Publication NO. 2011-43963 discloses a maritime communication apparatus and method that perform communication between a base station and a ship using a protocol that is appropriate for distance and signal intensity. However, the technology disclosed in this Korean patent application publication is very limited because it can be applied only to ships that are present within the distance over which radio waves can arrive from land.

Accordingly, there is a need for maritime wireless communication technology that can use a land-based mobile communication network, and can extend land-based wireless communication service to the sea and make the land-based wireless communication service available at sea.

SUMMARY OF THE INVENTION

Accordingly, the present invention has been made keeping in mind the above problems occurring in the prior art, and an object of the present invention is to provide a maritime wireless communication method that can extend land-based wireless communication service to the sea and make the land-based wireless communication service available at sea.

Another object of the present invention is to provide a maritime communication apparatus that can extend land-based wireless communication service to the sea and make the land-based wireless communication service available at sea.

In accordance with an aspect of the present invention, there is provided a maritime communication apparatus, including a land-based network communication unit configured to communicate with a land-based communication network; a maritime network communication unit configured to communicate with a maritime communication network; and a communication control unit configured to link the communication of the land-based network communication unit with the communication of the maritime network communication unit in accordance with a destination address of data provided by any one of the land-based network communication unit and the maritime network communication unit.

The land-based network communication unit may include a plurality of wireless network connection means corresponding to a plurality of land-based communication network connection systems.

The communication control unit may cause communication with the land-based communication network to be performed via the other maritime communication apparatus if communication with the land-based communication network via the other maritime communication apparatus is possible when communication with the land-based communication network via the land-based network communication unit is impossible.

The communication control unit may cause the data to be sent via International Maritime Satellite Organization (IN- MARSAT) or Very Small Aperture Terminal (VSAT) satellite communication if communication with the land-based communication network via the other maritime communication apparatus is impossible and the required bandwidth is equal to or higher than a first level.

The communication control unit may cause the data to be sent via Automatic Identification System (AIS) communication if communication with the land-based communication network via the other maritime communication apparatus is impossible and the required bandwidth is lower than the first level and equal to or higher than a second level.

The communication control unit may cause the data to be sent via Very High Frequency (VHF) band communication if communication with the land-based communication network via the other maritime communication apparatus is impossible and the required bandwidth is lower than the second level and equal to or higher than a third level.

The communication control unit may cause the data to be sent via Medium Frequency (MF)/High Frequency (HF) band communication if communication with the land-based communication network via the other maritime communication apparatus is impossible and the required bandwidth is lower than the third level.

The land-based network communication unit may include a plurality of wireless network connection means corresponding to an identical land-based communication network connection system in order to ensure bandwidth.

The maritime communication apparatus may further include a multi-band control unit configured to select wireless network connection means that belongs to the plurality of wireless network connection means and that will communicate with the land-based communication network, and to control communication of the selected wireless network connection means.

The maritime network communication unit may function as a relay station upon communication with the maritime network.

The communication control unit may transfer data provided by the land-based network communication unit to any one of the maritime network communication unit and a ship's internal communication network in accordance with a destination address of the data provided by the land-based network communication unit, and transfer data provided by the maritime network communication unit to any one of the land-based network communication unit and the ship's internal communication network in accordance with a destination address of the data provided by the maritime network communication unit.

In accordance with another aspect of the present invention, there is provided a maritime communication method that is performed by a maritime communication apparatus, the method including receiving data; determining a destination the received data; and sending the received data to any one of a maritime communication network and a land-based communication network in accordance with the determined destination.

The maritime communication method may further include, if direct communication with the land-based communication network is impossible, communicating with the land-based communication network via another maritime communication apparatus.

The maritime communication method may further include, if communication with the land-based communication network via the other maritime communication apparatus is impossible and the required bandwidth is equal to or higher than a first level, sending the data via INMARSAT or VSAT satellite communication.

The maritime communication method may further include, if communication with the land-based communication network via the other maritime communication apparatus is impossible and the required bandwidth is lower than the first level and equal to or higher than a second level, sending the data via AIS communication.

The maritime communication method may further include, if communication with the land-based communication network via the other maritime communication apparatus is impossible and the required bandwidth is lower than the second level and equal to or higher than a third level, sending the data via VHF band communication.

The maritime communication method may further include, if communication with the land-based communication network via the other maritime communication apparatus is impossible and the required bandwidth is lower than the third level, sending the data via MF/HF band communication.

Sending the received data may include, if the received data is received from the land-based communication network and the destination address of the received data is different from a destination address of the maritime communication apparatus, relaying the received data to the maritime communication network.

Sending the received data may include, if the received data is received from the maritime communication network and the destination address of the received data is different from a destination address of the maritime communication apparatus, relaying the received data to the land-based communication network or the maritime communication network.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
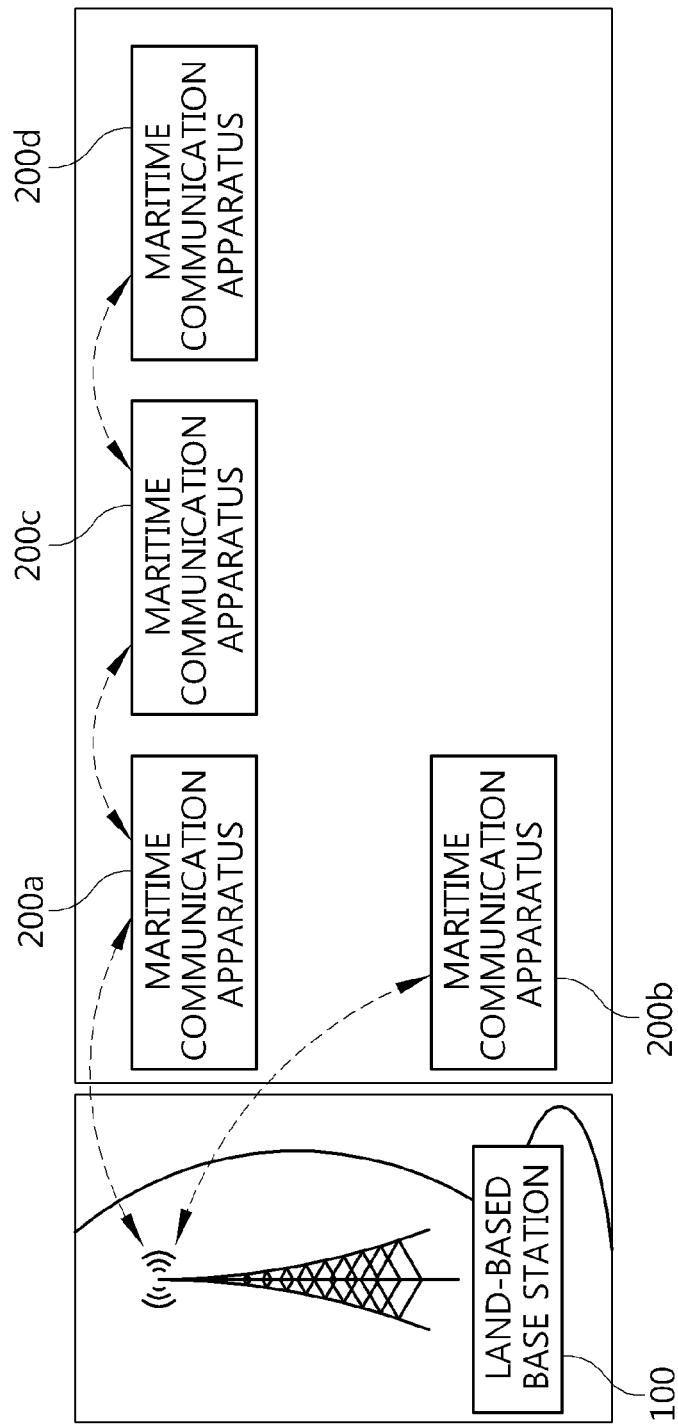
FIG. 1 is a conceptual diagram illustrating a maritime broadband wireless communication method in accordance with an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

Embodiments of the present invention will be described in detail with reference to the accompanying drawings.

Satellite communication technology, existing maritime communication technology, or land-based communication technology may be considered for technology for a new maritime broadband wireless communication infrastructure.

However, the satellite communication technology has high service costs, and the existing maritime communication technology has low data speed. Meanwhile, the land-based communication technology has a problem with the extension of a communication range, but the problem can be overcome technologically.

Accordingly, it is most appropriate to develop and adopt the land-based wireless communication technology that enables high-speed data communication, is inexpensive, and can guarantee reliability, as technology for a new maritime broadband wireless communication infrastructure.

In order to provide broadband wireless data communication service at sea, the present invention extends the communication range of a land-based wireless communication network using multi-hop relay technology at sea, and can thus provide broadband maritime communication service without requiring a fixed wireless data communication infrastructure that is required to perform maritime broadband wireless data communication.

FIG. 1 is a conceptual diagram illustrating a maritime wireless communication method in accordance with an embodiment of the present invention.

Referring to FIG. 1, maritime wireless communication in accordance with an embodiment of the present invention is performed using multi-hop relay technology between a land-based base station 100 and a plurality of maritime communication apparatuses 200a to 200d.

The land-based base station 100 is a base station that is fixedly installed on land. The land-based base station 100 may be, for example, a Long Term Evolution (LTE) base station, an LTE-Advanced base station, a WiBro (or WiMax) base station or a wireless access point (RRH, or RRE), or may be one of all communication apparatuses that function as a base station or a relay station in a mobile communication system or a wireless communication system on land.

The maritime communication apparatuses 200a to 200d perform a maritime wireless communication method in accordance with an embodiment of the present invention, and may be installed in ships and/or buoys. Each of the maritime communication apparatuses is connected to a commercial land-based communication network via a direct connection to the land-based base station 100, or is connected to a commercial land-based communication network through the relaying of one or more other maritime communication apparatuses, thereby functioning to extend land-based broadband data communication service to the sea.

For example, in FIG. 1, the maritime communication apparatuses 200a and 200b are directly connected to the land-based base station 100, and provide broadband wireless communication service, provided by the land-based base station 100, at sea.

Furthermore, the maritime communication apparatus 200c is connected to the land-based base station 100 through the relaying of the maritime communication apparatus 200a, and provides broadband wireless communication service at sea. The maritime communication apparatus 200d is connected to the land-based base station 100 through the relaying of the maritime communication apparatus 200a and the maritime communication apparatus 200c, and then provides broadband wireless communication service at sea.

As illustrating in FIG. 1, in the maritime wireless communication method in accordance with an embodiment of the present invention, a connection to the commercial land-based communication network may be set up through single hop or multi-hop relaying, which enables land-based broadband communication service to be extended to the sea. Although a connection through relaying over a maximum of two hops among the maritime communication apparatuses is illustrated in FIG. 1 by way of example, this is illustrated merely for ease of description, and the relay hop count that may be applied to the connection of the maritime communication apparatus to the commercial land-based communication network is not limited.

Figure 2:
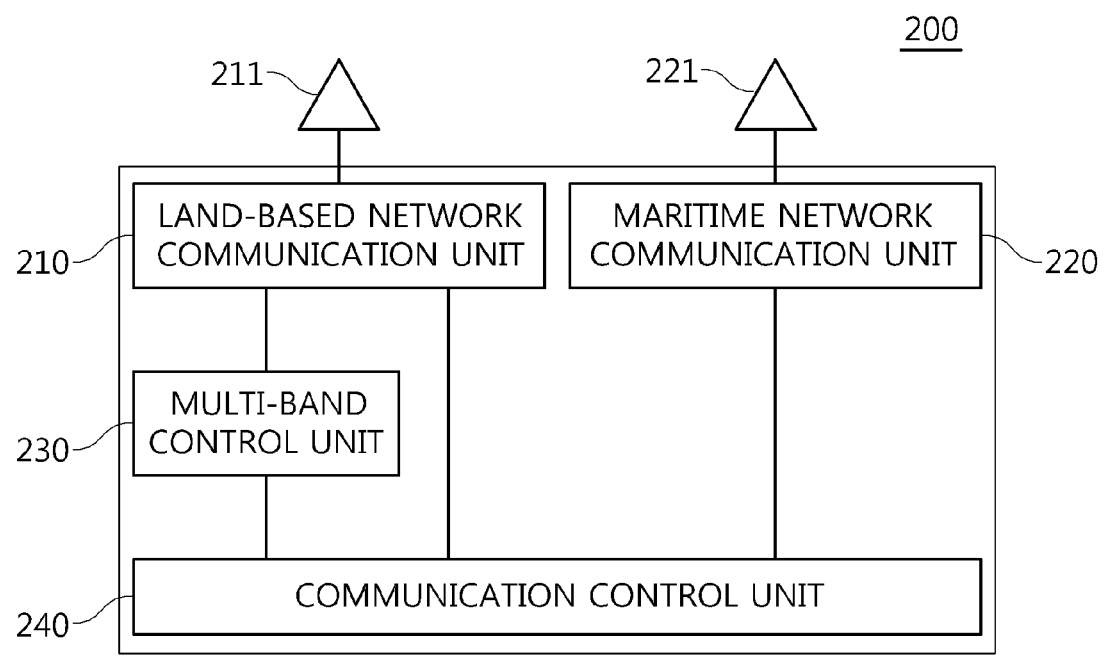
FIG. 2 is a block diagram illustrating the configuration of a maritime communication apparatus in accordance with an embodiment of the present invention.

FIG. 2 is a block diagram illustrating the configuration of a maritime communication apparatus in accordance with an embodiment of the present invention. FIG. 2 illustrates the detailed configuration of each of the maritime communication apparatuses 200a, 200b, 200c, and 200d illustrated in FIG. 1.

Referring to FIG. 2, the maritime communication apparatus 200 may include a land-based network communication unit 210, a maritime network communication unit 220, a multi-band control unit 230, and a communication control unit 240.

The land-based network communication unit 210 sets up a connection to the land-based base station 100, provides data received from the land-based base station 100 to the communication control unit 240, and sends data provided by the communication control unit 240 to the land-based base station 100. More specifically, the land-based network communication unit 210 functions as a terminal that connects to a commercial land-based network and communicates.

The land-based network communication unit 210 may include various types of network connection means (modems or terminals) corresponding to various types of land-based wireless network connection systems in order to connect to various types of commercial land-based communication networks. For example, the land-based network communication unit 210 may include a modem or a terminal for connecting to a Wideband Code Division Multiple Access (WCDMA) network, a modem or a terminal for connecting to a WiBro network, and a modem or a terminal for a connecting to an LTE network.

In this case, the land-based network communication unit 210 may include a plurality of wireless network connection means corresponding to the same land-based communication network connection system in order to ensure bandwidth. For example, the land-based network communication unit 210 includes four LTE network connection means, thereby ensuring required bandwidth.

Furthermore, the land-based network communication unit 210 may include a Radio Frequency (RF) module 211 corresponding to a corresponding network connection function in order to support the above-described various network connection functions. The RF module 211 may include an RF amplifier and transmission and reception antennas.

Since the maritime communication apparatus 200 in accordance with an embodiment of the present invention may be installed on a ship or a buoy, it does not have limitations with respect to working power, but may be highly affected by a maritime environment, including waves, wind, fog, etc., compared with a mobile terminal on land. Accordingly, the RF module 211 may be configured to have increased RF power and antenna efficiency within a range in which a land-based network is not adversely affected, compared to a mobile terminal on land.

The maritime network communication unit 220 establishes a maritime communication network along with a maritime communication system (another maritime communication apparatus or an existing maritime communication system) using the maritime frequency band, and communicates with the maritime communication system over the maritime communication network.

The maritime network communication unit 220 provides data received from the maritime communication network or another maritime communication apparatus to the communication control unit 240, and sends data provided by the communication control unit 240 to the maritime communication network or another maritime communication apparatus.

The maritime network communication unit 220 may include an RF module 221 for maritime communication, and the RF module 221 may include an RF amplifier and transmission and reception antennas corresponding to maritime communication.

In an embodiment of the present invention, the maritime communication network is constructed among the maritime communication apparatuses using multi-hop relay technology. Accordingly, as the hop count increases, data transmission delay may increase, with the result that it may be difficult to guarantee Quality of Service (QoS).

In order to overcome the above problem, a scheme for reducing the hop count is required. A method of reducing the hop count by maximally extending the communication distance for a single hop may be adopted as the scheme.

Since the maritime communication network uses a maritime frequency band, rather than the commercial frequency band of the land-based communication network, it has few limitations with respect to RF power. Accordingly, in an embodiment of the present invention, the communication distance of the maritime communication is extended by increasing the RF power of the RF module 221, and antenna efficiency is increased by employing beamforming, smart antenna, and Multiple Input Multiple Output (MIMO) technologies.

The multi-band control unit 230 selects an optimum communication method from among various communication methods to connect the land-based communication network based on information about the plurality of modems or terminals that constitute the land-based network communication unit 210, and performs control so that the land-based network communication unit 210 connects to the land-based communication network according to the selected communication method.

The communication control unit 240 is located between the land-based network communication unit 210 and the maritime network communication unit 220, and functions to link the communication of the land-based communication unit 210 to the communication of the maritime network communication unit 220.

More specifically, the communication control unit 240 analyzes and/or converts data received via the land-based network communication unit 210 and provides analysis and conversion results to the maritime network communication unit 220, and analyzes and/or converts data received via the maritime network communication unit 220 and provides analysis and conversion results to the land-based network communication unit 210, thereby controlling data relaying between the land-based base station and another maritime communication apparatus.

Furthermore, the communication control unit 240 performs the functions of a relay station, such as data routing, resource management, and Internet Protocol (IP) management, in connection with the maritime communication network during data communication over the maritime communication network, and may control data relaying between the maritime communication apparatuses.

The communication control unit 240 determines whether communication with the land-based communication network via the land-based network communication unit 210 is possible. If it is determined that communication with the land-based communication network is not possible, the communication control unit 240 determines whether communication with the land-based communication network via another maritime communication apparatus is possible. In this case, if it is determined that communication with the land-based communication network via another maritime communication apparatus is possible, the communication control unit 240 may perform control so that communication with the land-based communication network is performed via the other maritime communication apparatus.

In contrast, if it is determined that communication with the land-based communication network via the other maritime communication apparatus is not possible, the communication control unit 240 may select any one from among International Maritime Satellite Organization (INMARSAT) Fleet Broadband (FB) satellite communication (or Very Small Aperture Terminal (VSAT) satellite communication), Automatic Identification System (AIS) communication, Very High Frequency (VHF) band communication, and Medium Frequency (MF)/High Frequency (HF) communication based on the required bandwidth, and then send data via the selected communication.

For example, if the communication control unit 240 cannot communicate with the land-based communication network via another maritime communication apparatus, it may send data via INMARSAT VSAT satellite communication if the required bandwidth is equal to or higher than 9.6 Kbps, may send data using AIS if the required bandwidth is equal to or higher than 1.2 Kbps and lower than 9.6 Kbps, may send data via VHF band communication if the required bandwidth is equal to or higher than 300 bps and lower than 1.2 Kbps, and may send data via MF/HF band communication if the required bandwidth is lower than 300 bps.

Even when communication via multi-hop relaying in accordance with the present invention is impossible, data is enabled using an optimum communication system based on the required band, with the result that the efficiency of maritime communication system is maximized.

Figure 3:
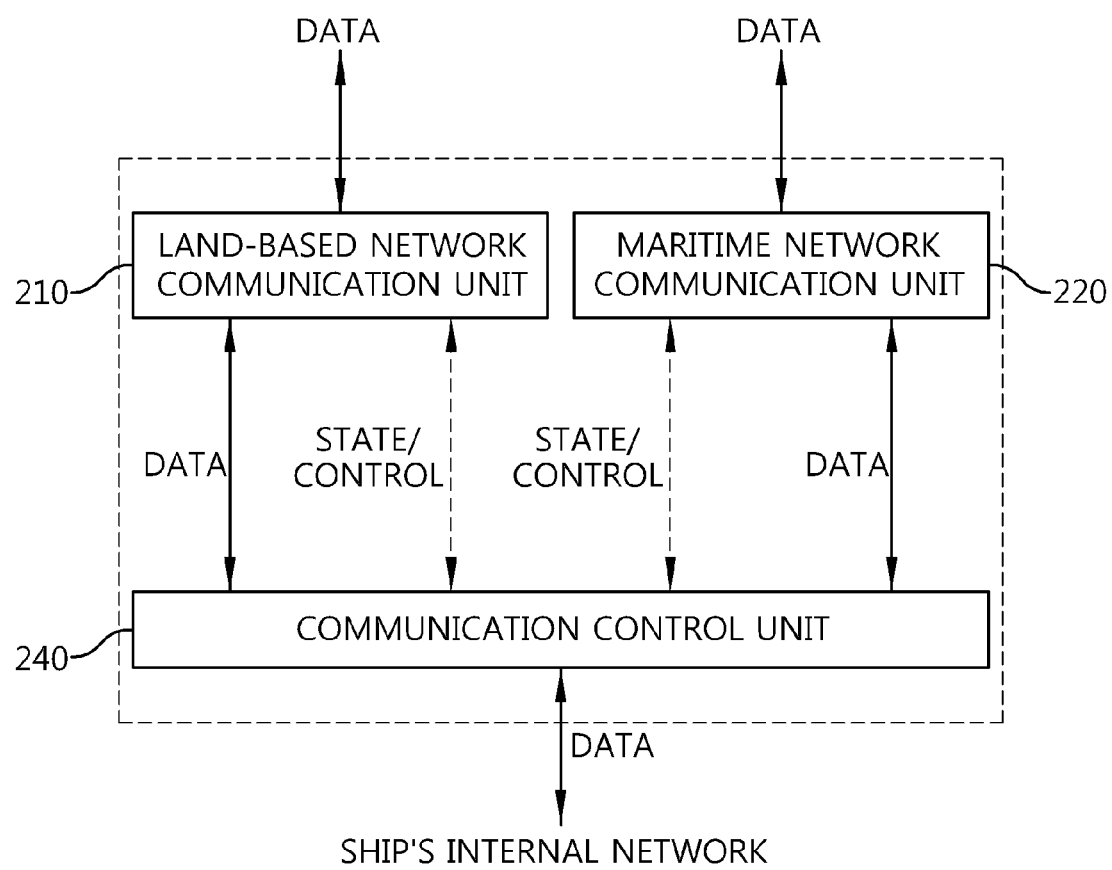
FIG. 3 is a conceptual diagram illustrating the operation of the communication control unit illustrated in FIG. 2.

FIG. 3 is a conceptual diagram illustrating the operation of the communication control unit illustrated in FIG. 2. FIG. 3 illustrates the flows of data, states, and the flows of control information among the land-based network communication unit 210, the maritime network communication unit 220, and the communication control unit 240.

Referring to FIG. 3, when data received via the land-based network communication unit 210 is transferred to the communication control unit 240, the communication control unit 240 determines the destination address of the received data by examining the routing information of the received data.

Thereafter, the communication control unit 240 transfers the received data to a ship's internal network if the destination address of the received data is the same as its own address (that is, the address of the maritime communication apparatus), and transfers the received data to the maritime network communication unit 220 if the destination address of the received data is not the same as its own address.

In contrast, when data is received via the maritime network communication unit 220, the communication control unit 240 determines the destination address of the received data by examining the routing information of the received data, transfers the received data to the ship's internal network if the destination address of the received data is the same as its own address, and transfers the received data to the land-based network communication unit 210 if the destination address of the received data is not the same as its own address.

In contrast, when data is received from the ship's internal network, the communication control unit 240 transfers data to any one of the land-based network communication unit 210 or the maritime network communication unit 220 in accordance with the destination address and/or data type of the provided data.

Meanwhile, the land-based network communication unit 210 provides the state information and/or control information of the modem or terminal provided in the land-based network communication unit 210 to the communication control unit 240, and the communication control unit 240 provides control information to the land-based network communication unit 210. Here, the state information that the land-based network communication unit 210 provides to the communication control unit 240 may include frequency, received signal intensity, and resource allocation information, and the control information exchanged between the land-based network communication unit 210 and the communication control unit 240 may include call setup information, call release information, etc.

Furthermore, the maritime network communication unit 210 may provide state information (for example, frequency, received signal intensity, resource allocation information, etc.) and/or control information (for example, call setup, call release information, etc.) to the communication control unit 240, and the communication control unit 240 may transfer control information, such as call setup information or call release information, to the maritime network communication unit 220.

Figure 4:
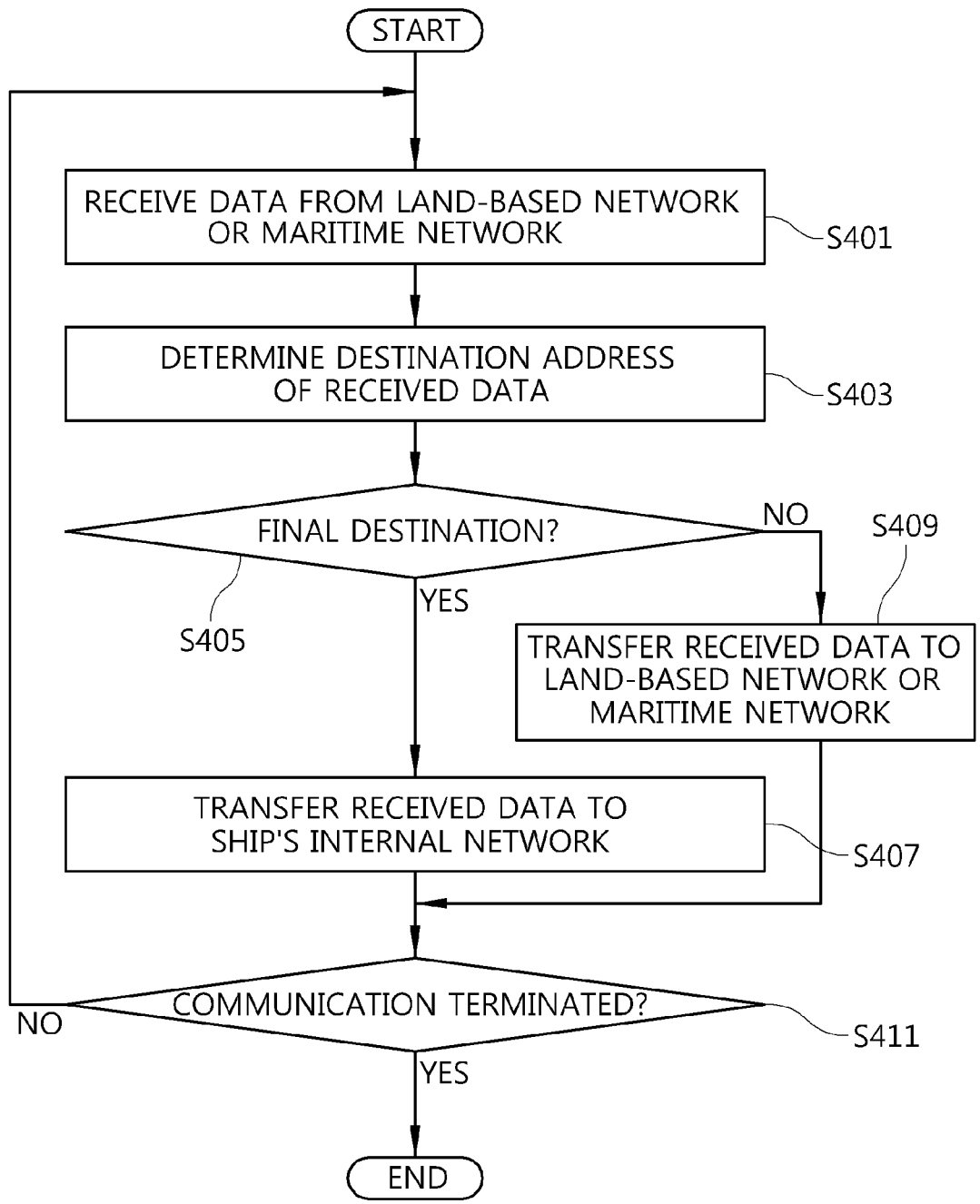
FIG. 4 is a flowchart illustrating a maritime broadband wireless communication method in accordance with an embodiment of the present invention.

FIG. 4 is a flowchart illustrating a maritime wireless communication method in accordance with an embodiment of the present invention. FIG. 4 illustrates the process of controlling maritime wireless communication that is performed by the communication control unit illustrated in FIG. 2.

Referring to FIG. 4, when the maritime communication apparatus receives data from the land-based network or maritime network at step S401, it determines the destination address of the received data at step S403.

Thereafter, the maritime communication apparatus determines whether it is a final destination by comparing the determined destination address with its own address at step S405, and transfers the received data to a ship's internal network if it is a final destination.

In contrast, the maritime communication apparatus transfers the received data to the maritime network or land-based network if, as a result of the determination at step S405, it is not a final destination. Here, the maritime communication apparatus transfers the received data to the maritime network if the received data is received from the land-based network, transfers the received data to the land-based network or relays the received data to another maritime communication apparatus based on the address of the destination if the received data is received from the maritime network.

The maritime communication apparatus determines whether communication has been terminated at step S411, and repeats the above-described process (that is, steps S401 to S409) until communication will be terminated if communication has not been terminated.

Although not shown in FIG. 4, the maritime wireless communication method in accordance with an embodiment of the present invention may further include the step of communicating with the land-based communication network via another maritime communication apparatus if it cannot communicate directly with the land-based communication network.

Furthermore, the maritime wireless communication method in accordance with an embodiment of the present invention may further include the step of sending the data via INMARSAT or VSAT satellite communication if it is impossible to communicate with the land-based communication network via another maritime communication apparatus and the required bandwidth is equal to or higher than a first level (for example, 9.6 Kbps).

Furthermore, maritime wireless communication method in accordance with an embodiment of the present invention may further include the step of sending the data via AIS communication if it is impossible to communicate with the land-based communication network via another maritime communication apparatus and the required bandwidth is lower than the first level (for example, 9.6 Kbps) and equal to or higher than a second level (for example, 1.2 Kbps).

Furthermore, the maritime wireless communication method in accordance with an embodiment of the present invention may further include the step of sending the data via VHF band communication if it is impossible to communicate with the land-based communication network via another maritime communication apparatus and the required bandwidth is lower than the second level (for example, 1.2 Kbps) and equal to or higher than the third level (for example, 300 bps).

Furthermore, the maritime wireless communication method in accordance with an embodiment of the present invention may further include the step of sending the data via MF/HF band communication via another maritime communication apparatus if it is impossible to communicate with the land-based communication network and the required bandwidth is lower than the third level (for example, 300 bps).

In accordance with the present invention, the maritime communication apparatus transfers data, received from the land-based communication network, to the maritime communication network through multi-hop relaying via the land-based network communication unit configured to connect to the land-based communication network, the maritime communication unit configured to connect to the maritime communication network, and the communication control unit configured to control the relaying of data between the land-based network and the maritime network based on the address of a received signal.

Accordingly, broadband data service provided over the land-based communication network can be extended to the sea, and thus the communication cost can be reduced by reducing the use of satellite communication service.

Furthermore, broadband data service is provided through multi-hop relay using the maritime communication apparatuses installed on ships and/or buoys, and thus the costs of the construction and management of additional infrastructures for broadband data service can be reduced.

Furthermore, the maritime communication apparatus of the present invention can support various wireless connection methods for connecting to various types of land-based communication networks, and thus it can broadband data service in conjunction with various wireless communication methods without restriction to a specific land-based wireless communication method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A maritime communication apparatus, comprising:
 a land-based network communication unit configured to communicate with a land-based communication network;

a maritime network communication unit configured to communicate with a maritime communication network; and a communication control unit configured to link communication of the land-based network communication unit with communication of the maritime network communication unit in accordance with a destination address of data received from one of the land-based network communication unit and the maritime network communication unit, the communication control unit being configured to, upon determining that the destination address of the received data is not the maritime communication apparatus, send the received data to the maritime communication network when the data is received from the land-based communication network, and send the received data to the land-based communication network, or relay the data to another maritime communication apparatus in accordance with the determined destination address, when the data is received from the maritime communication network, wherein the land-based network communication unit includes a plurality of wireless network connection means corresponding to a plurality of land-based communication network connection systems, wherein the communication control unit causes communication with the land-based communication network to be performed via the other maritime communication apparatus when communication with the land-based communication network via the other maritime communication apparatus is possible when communication with the land-based communication network via the land-based network communication unit is impossible, wherein the communication control unit causes the data to be sent via International Maritime Satellite Organization (INMARSAT) or Very Small Aperture Terminal (VSAT) satellite communication when communication with the land-based communication network via the other maritime communication apparatus is impossible and required bandwidth is equal to or higher than a first level, and wherein the communication control unit causes the data to be sent via Automatic Identification System (AIS) communication when communication with the land-based communication network via the other maritime communication apparatus is impossible and required bandwidth is lower than the first level and equal to or higher than a second level.

2. The maritime communication apparatus of claim 1, wherein the communication control unit causes the data to be sent via Very High Frequency (VHF) band communication when communication with the land-based communication network via the other maritime communication apparatus is impossible and required bandwidth is lower than the second level and equal to or higher than a third level.

3. The maritime communication apparatus of claim 2, wherein the communication control unit causes the data to be sent via Medium Frequency (MF)/High Frequency (HF) band communication when communication with the land-based communication network via the other maritime communication apparatus is impossible and the required bandwidth is lower than the third level.

4. The maritime communication apparatus of claim 3, wherein the land-based network communication unit includes a plurality of wireless network connection means corresponding to an identical land-based communication network connection system in order to ensure bandwidth.

5. The maritime communication apparatus of claim 1, further comprising a multi-band control unit configured to select wireless network connection means that belongs to the plurality of wireless network connection means and that will communicate with the land-based communication network, and to control communication of the selected wireless network connection means.

6. The maritime communication apparatus of claim 1, wherein the maritime network communication unit functions as a relay station upon communication with the maritime network.

7. A maritime communication method of a maritime communication apparatus, the method comprising:

receiving data from one of a maritime communication network and a land-based communication network;

determining a destination address of the received data; and upon determining that the destination address of the received data is not the maritime communication apparatus, sending the received data to the maritime communication network when the data is received from the land-based communication network, and sending the received data to the land-based communication network, or relaying the received data to another maritime communication apparatus in accordance with the determined destination address, when the data is received from the maritime communication network, when direct communication with the land-based communication network is impossible, communicating with the land-based communication network via another maritime communication apparatus, when communication with the land-based communication network via the other maritime communication apparatus is impossible and required bandwidth is equal to or higher than a first level, sending the data via International Maritime Satellite Organization (INMARSAT) or Very Small Aperture Terminal (VSAT) satellite communication, and when communication with the land-based communication network via the other maritime communication apparatus is impossible and required bandwidth is lower than the first level and equal to or higher than a second level, sending the data via Automatic Identification System (AIS) communication.

8. The maritime communication method of claim 7, further comprising, when communication with the land-based communication network via the other maritime communication apparatus is impossible and required bandwidth is lower than the second level and equal to or higher than a third level, sending the data via Very High Frequency (VHF) band communication.

9. The maritime communication method of claim 8, further comprising, when communication with the land-based communication network via the other maritime communication apparatus is impossible and the required bandwidth is lower than the third level, sending the data via Medium Frequency (MF)/High Frequency (HF) band communication.

10. The maritime communication apparatus of claim 1, wherein the communication control unit is configured to, upon determining that the destination address of the received data is the maritime communication apparatus, transfer the data to an internal network corresponding to the maritime communication apparatus.

11. The maritime communication method of claim 7, further comprising, upon determining that the destination address of the received data is the maritime communication apparatus, transferring the data to an internal network corresponding to the maritime communication apparatus.

* * * * *